F. B. RAE.
ELECTRIC BRAKE.
APPLICATION FILED JAN. 10, 1906.
926,605.
Patented June 29, 1909.
4 SHEETS—SHEET 3.
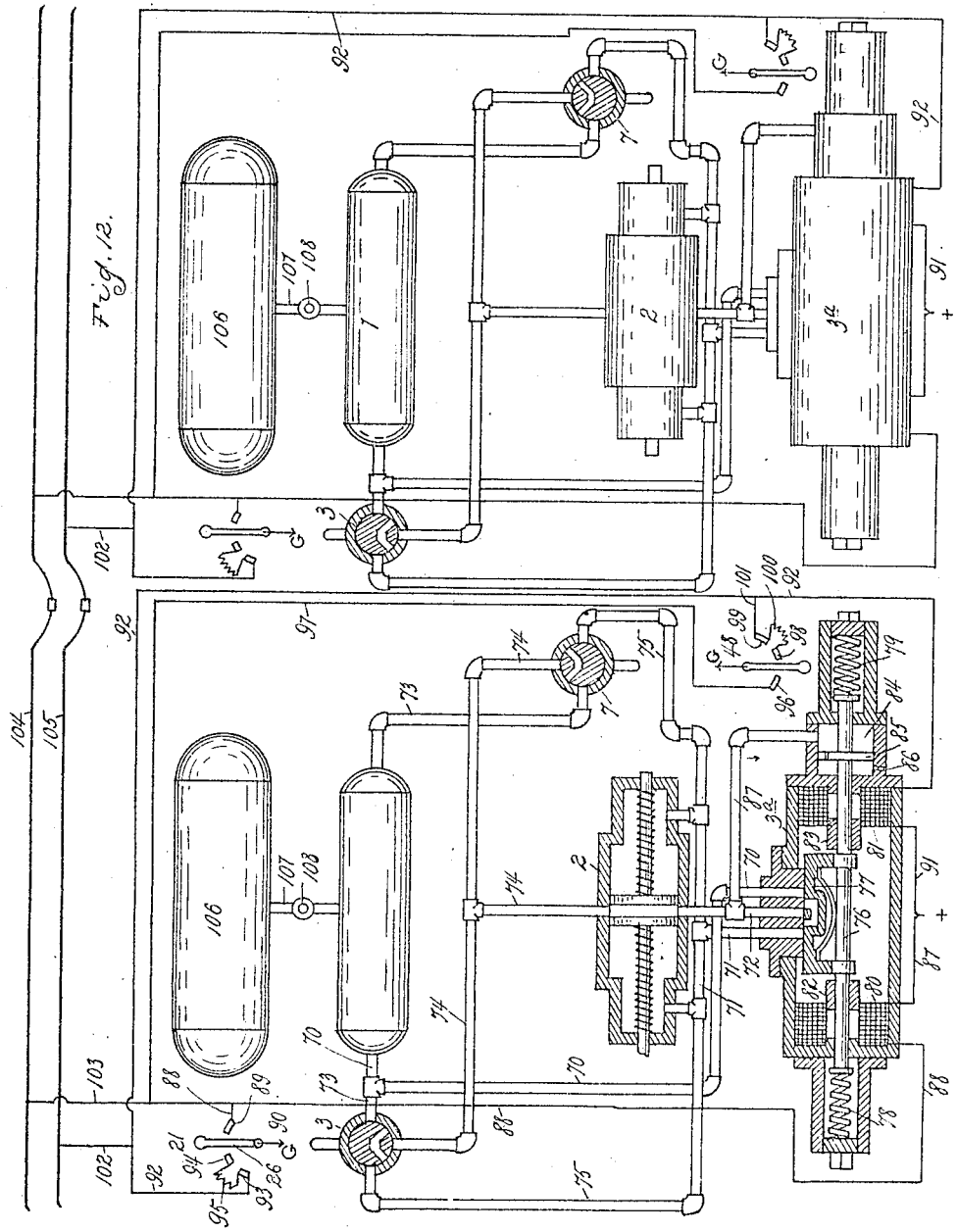

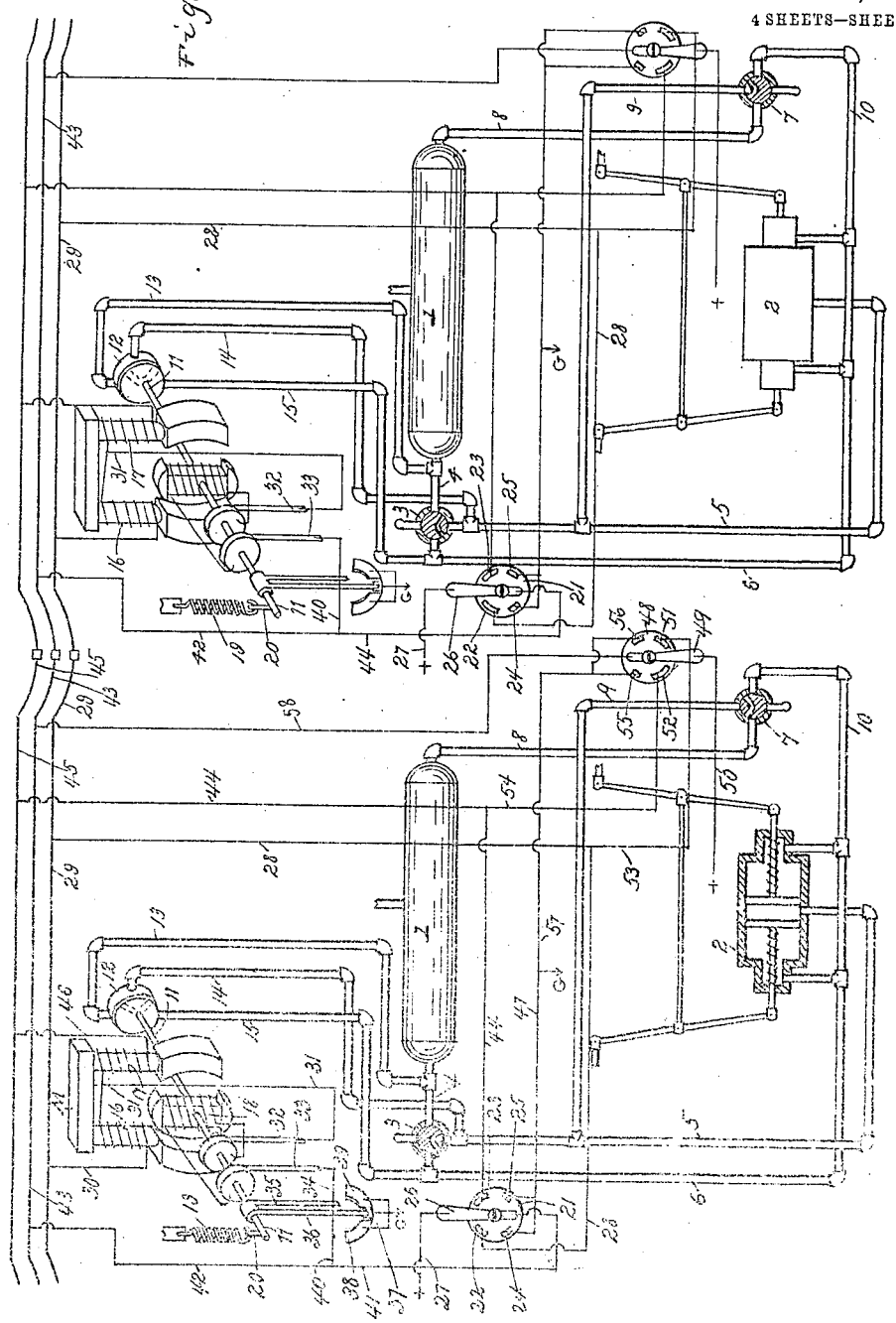

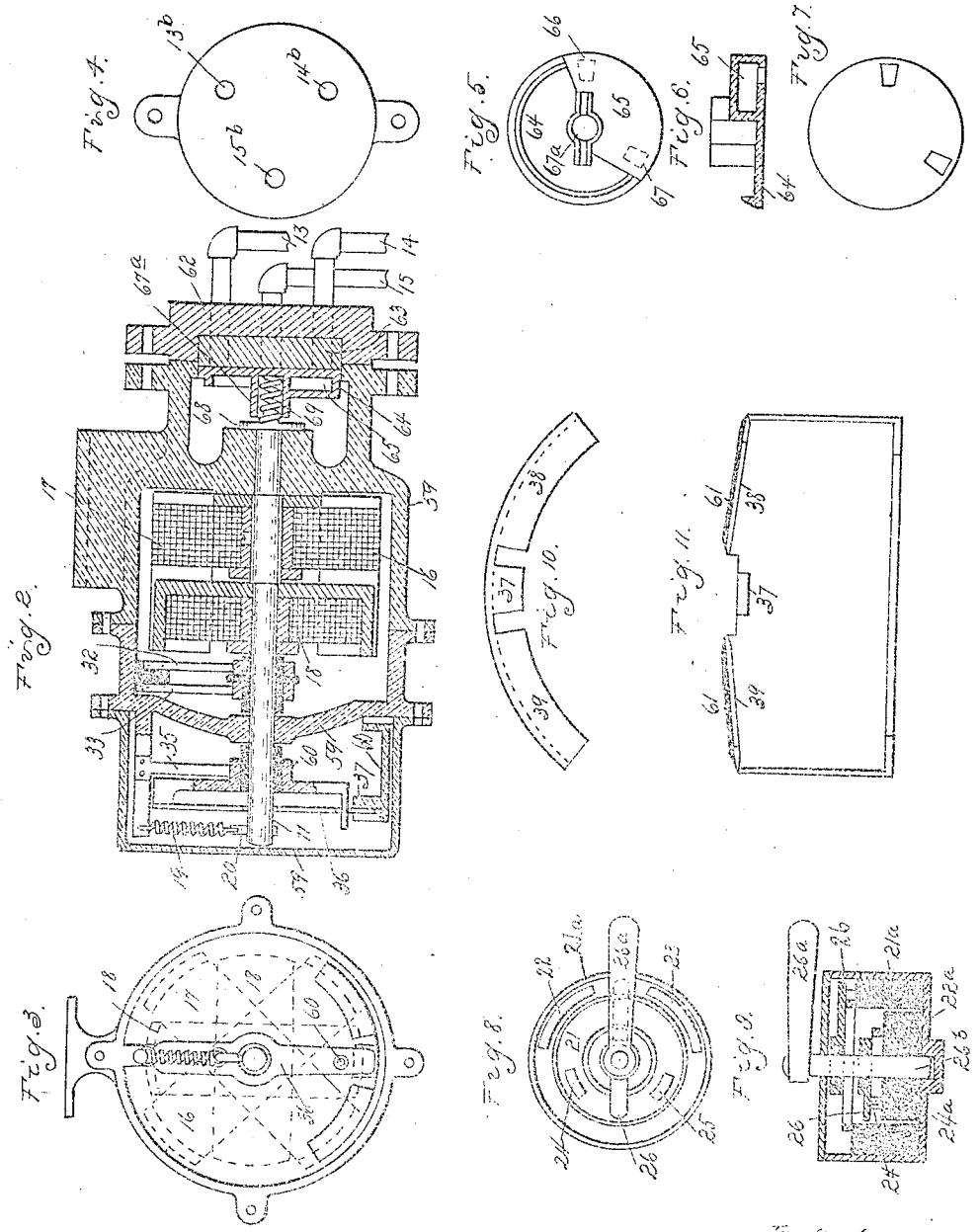

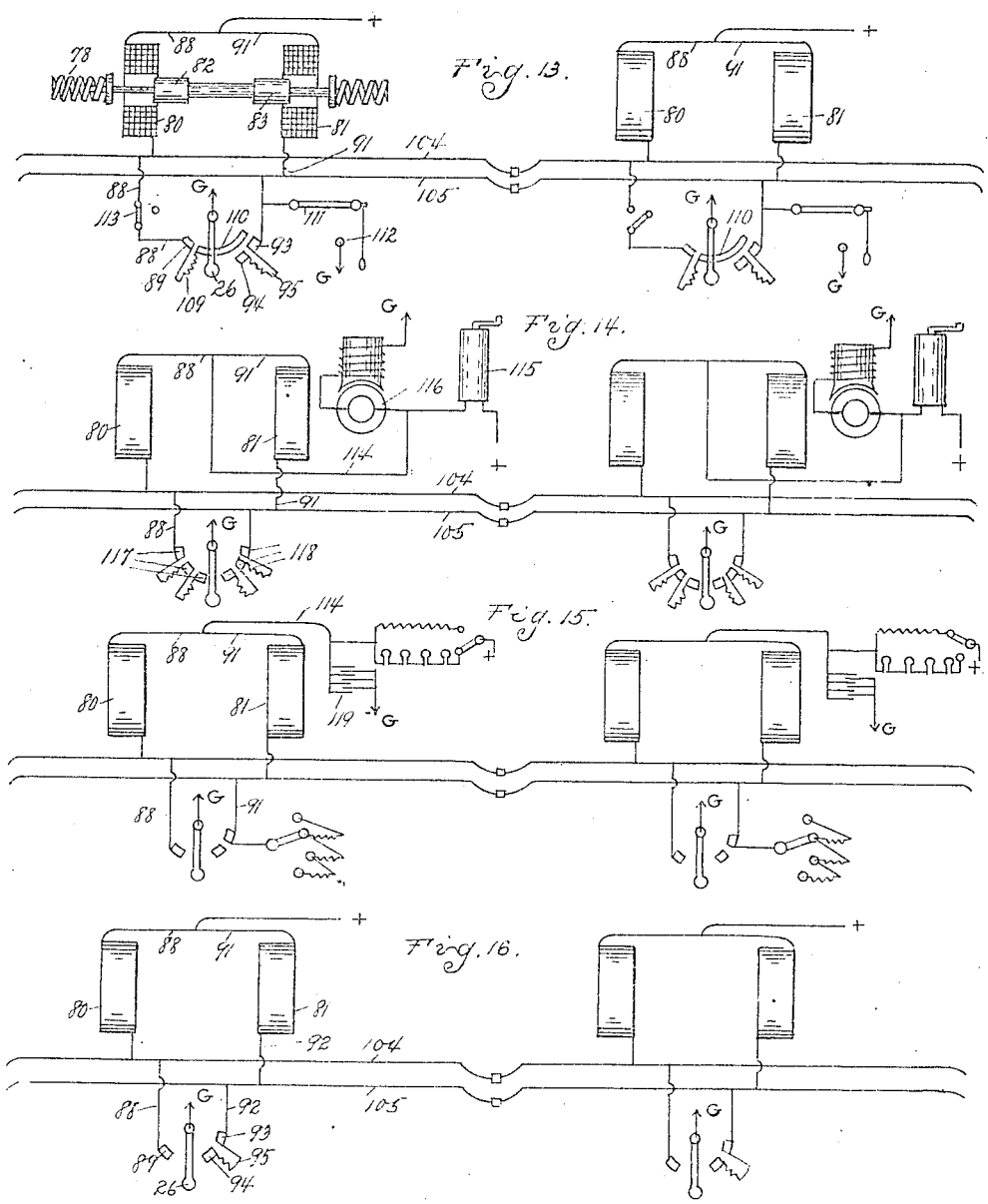

UNITED STATES PATENT OFFICE.

FRANK B. RAE, OF DETROIT, MICHIGAN, ASSIGNOR, BY MESNE ASSIGNMENTS, TO RAE ELECTRIC COMPANY, A CORPORATION OF MICHIGAN.

ELECTRIC BRAKE.

No. 926,605.         Specification of Letters Patent.         Patented June 29, 1909.

Application filed January 10, 1906. Serial No. 295,346.

*To all whom it may concern:*

Be it known that I, FRANK B. RAE, a citizen of the United States, residing at Detroit, in the county of Wayne and State of Michigan, have invented certain new and useful Improvements in Electric Brakes, of which the following is a full, clear, and exact specification.

This invention relates to brake mechanism and has particular reference to the controlling means for regulating the application of pressure to the brake.

The object is to provide means for electrically controlling the operating pressure, thus obviating the necessity of train pipe connections between the several cars of a multiple unit system.

The invention is peculiarly applicable for use in systems wherein several cars are operated together, although of course, the invention may be operated upon any one car independently of the others, either alone or when coupled with other cars.

Broadly speaking the invention comprises a suitable brake mechanism with a reservoir containing air under pressure, a valve controlling the introduction of pressure from the reservoir to the brake cylinder, and electrical means for operating the valve. A particular novel valve which I use is governed by a controller and is adapted to admit pressure to the brake cylinder and then to release it automatically, and to repeat this action indefinitely as long as the controlling means is held in a certain position. By this construction a number of very powerful but short applications of the brake are given and the momentum of the vehicle will be arrested by this "fanning" action without shock and without skidding the wheels.

The invention will be more particularly described with reference to the forms thereof shown in the accompanying drawings, in which—

Figure 1 is a diagram view of a system embodying my invention, Fig. 2 is a detail sectional view of the motor and the controlling valve, Fig. 3 is an end view of the motor shown in Fig. 2, Fig. 4 is an end view of the valve showing the position of the ports, Figs. 5, 6 and 7 are detail views of the valve slide showing respectively the outer side, a vertical section, and the inner side of the same. Fig. 8 is a top view, and Fig. 9 a sectional view, of the controller for the electric circuits, Figs. 10 and 11 are respectively detail end and side views of the contact segments in the motor. Fig. 12 is a diagram of a modified system, showing a different arrangement of circuits and modified form of valve, and Figs. 13 to 16 inclusive are diagrams showing various modified arrangements of circuits.

Referring more particularly to the drawings, 1, 1, represent the reservoirs upon the various cars, 2, 2, the brake cylinders, and 3 a valve controlling the communications between the reservoir and brake cylinder.

In Fig. 1 a pipe 4 leads from reservoir 1 to valve 3, and pipes 5 and 6 lead to the respective sides of the brake pistons in the brake cylinder. The piston rods are loosely packed in the ends of the brake cylinder to permit air to pass from that side of the brake pistons to the atmosphere. In order to permit the system to be operated from either end of the car, the valve 7 may be located at the other end, and the valve 3 connected by pipes 8, 9 and 10 respectively with reservoir 1 and pipes 5 and 6. The shaft 11 of motor M may be attached directly to valve 3 if preferred, but in order to permit the mechanism to be operated without using the electrical means if so desired, I provide a separate controlling valve 12 and by pipes 13, 14 and 15 connect it respectively with pipes 4, 5 and 6, and I attach shaft 11 of motor M directly to valve 12. Motor M is provided with separate field coils 16 and 17, whereby as one or the other of said coils is energized the armature 18 will make a quarter revolution in one or the other direction and stop. A spring 19 is attached to shaft 11, or to an arm 20 thereon, and normally holds shaft 11 in position to close all the ports of valve 12 and thus shut off communication between the reservoir and brake cylinder. The electric current is derived from any suitable source, as from the trolley where the cars are electrically propelled, or from a generator or storage battery carried by the car where the latter is propelled by an engine. The electric controller 21 is provided with the contact segments 22, 23, 24 and 25, these being so arranged that blade 26, which by insulation is divided into two parts one on each side of the pivot, first contacts with segment 22 or 23 without making contact with segment 24 or 25. When the blade is moved farther it contacts with both segments 22, 25 or 23, 24. The connections shown are as follows: From the source of supply a wire 27 leads to the switch blade 26. A wire 28 leads from segment 22 to wire 29 which extends the length of the car, and where several cars are operated together the wires 29 of the several cars are connected. From wire 29 a wire 30 leads to field coil 16, and from thence a wire 31, connected to both field coils 16 and 17, leads to the brush 32 of motor M. From brush 33 of motor M a wire 34 leads to the brush 35 making contact with shaft 11 and electrically connected to blade 36, mounted on shaft 11 and contact with segments 37, 38, 39 as hereinafter described. These segments are electrically connected with each other and with ground. From brush 35 wire 40 leads to wires 41 and 42, the former connecting with the end of blade 26, and the latter with wire 43 which extends the length of the car, and where several cars are operated together, with the corresponding wire upon the other cars. From contact 23 a wire 44 leads to wire 45, which extends throughout the train the same as wires 29 and 43, and from wire 45 a wire 46 leads to coil 17. A wire 47 connects contacts 24 and 25 with ground. For convenience a controlling switch 48, similar to controller 21 may be located upon the opposite end of the car. When used its ends 49 may be connected by wire 50 with the source +, and segments 51, 52 may be connected by wires 53, 54 with wires 28 and 44 respectively, and segments 55, 56 may be connected by wire 57 with ground. The opposite end of the blade 49 will be connected by wire 58 with wire 43.

The construction of the controlling switch, motor and valve 12 are shown in detail in Figs. 2 to 11 inclusive. The switch comprises the casing 21ª, containing the insulation supports 22ª and 24ª for the segments 22, 23 and 24, 25 respectively. The blades 26, making contact with the respective segments 22, 23 and 24, 25, are mounted upon but insulated from the shaft 26ᵇ which is suitably mounted in the casing and is moved by the handle 26ª. The motor shown in Figs. 2 and 3 comprises the shaft 11 mounted in a suitable casing 59. The armature 18 is mounted on shaft 11 and the coil electrically connected with the commutators against which brushes 32, 33 contact. The field coils 16, 17 are rigidly supported upon the casing. The brush 35 is mounted in the casing and contacts with the collar of the standard 60 which is rigidly mounted upon but insulated from the shaft 11. Standard 60 supports the blade 36 which is of suitable resilient material, one end of the blade being rigidly attached to the standard and the other end of the standard projecting through the blade, in order to permit movement of the blade at that end. The segments 37, 38 and 39 are attached to the casing and are shown in detail in Figs. 10 and 11. Segments 38 and 39 are overlaid on top with insulation 61 and are inclined, with respect to segment 37, the segments being so arranged that when the resilient blade resting on segment 37 is moved its edge will meet the under side of the segment 38 or 39 and thus cause the blade to travel along the under side of the segment, the blade bending as it moves. When the blade reaches the end of the segment it will snap upward and away from the segment. When moved backward the segment meets and travels along the upper insulated face of the segment until it reaches segment 37, when it snaps against the same. The valve 12 is arranged upon the end of the motor casing. A flat end plate 62 holds the valve plate 63 in place, and through these plates pass the ports for pipes 13, 14, 15. Upon the plate 63 is fitted a plate 64 having a chamber 65 and two ports 66, 67, adapted to connect any two of ports 14ᵇ, 15ᵇ, according as plate 64 is turned. Plate 64 is provided with a slotted socket 67ª into which projects a locking pin 68 carried by shaft 11, the pin being fitted in the socket so as to turn the plate with the shaft. A spring 69 is inserted between the pin 68 and plate 64 in order to insure a maintenance of the plate in position against plate 63. When shaft 11 is rotated the plate 64 is consequently rotated, connecting the various ports according to the direction and extent of rotation.

The operation of the system thus far described is substantially as follows: Assume that several cars are coupled together and that the system is to be operated from the controller 21 at the left hand of Fig. 1. The valves 3 and 7 upon all the cars will be closed, and springs 19 will hold valves 12 in the closed position, shown in the drawings. If the operator desires to apply the brakes by successive applications of air, he moves the controller to make contact with segment 22, thereupon establishing a circuit from the source + through wire 27, blade 26, segment 22, wires 28, 29, 30, field coil 16, wire 31, brush 32, armature 18, brush 33, wire 34, brush 35, blade 36, and segment 37 to ground. This circuit being established the armature 18 is given a quarter turn which connects the ports of pipes 13 and 14, thus opening communication between reservoir 1 through pipe 13, valve 12, pipe 14 and pipe 5 to the brake cylinder. But in turning, the shaft 11 moves the blade 36 along the underside of segment 39. Just after the shaft has turned sufficiently far to establish communication between pipes 13 and 14 the blade 36 will pass from beneath segments 39, and, in springing away from said segment will break the circuit. Thereupon spring 19 will restore the armature to its natural position, cutting off communication between the reservoir and the brake cylinder. When spring 19 restores the parts blade 36 will again make contact with segment 37, and thereupon the circuit above described will be again established and the valve will be again operated to establish communication between the reservoir and brake cylinder. This opening and closing of the valve will continue as long as the controller blade is left in this position. To effect an emergency application the blade is moved far enough to make contact with segment 25. When this contact is made a permanent ground is established from brush 35 through wires 40 and 41, blade 26, segment 25 and wire 47 to ground, thus maintaining armature 18 in position to maintain the communication between pipes 13 and 14. Similar action of the apparatus will take place upon all the other cars of the system by reason of establishment of similar circuits through wire 29, upon each of the other cars. The brakes may be released gradually by moving blade 26 into contact with segment 23, thus establishing a circuit from the source +, through wire 27, blade 26, segment 23, wires 44, 45 and 46, field 17, wire 31, brush 32, armature 18, brush 33, wire 34, brush 35, blade 36, segment 37 and ground. This circuit causes the movement of the motor in the opposite direction to connect pipes 14 and 15, thus connecting the two ends of the brake cylinder with the opposite sides of the piston faces, and permitting the air to pass out from the ends of the brake cylinder. In this instance blade 36 moves along the underside of segment 38 and breaks contact therewith when the valve connects pipes 14 and 15. The spring 19 then restores the valve and returns the circuit whereupon the motor continues to operate the valve. By moving blade 26 into contact with segment 24 a permanent ground is established from segment 24 through wire 44 to ground, and the above described circuit causes armature 18 to be permanently held in the position in which the valve connects pipes 14 and 15.

In the modification shown in Fig. 12 a special form of controlling valve 3ª is shown. The reservoir is connected with valve 3ª by a pipe 70, the opposite ends of the brake cylinder are connected with valve 3ª by a pipe 71, and the working surfaces of the piston in the brake cylinder are connected with valve 3ª by a pipe 72.

In order that the system may be operated without the electric controller if desired the hand valves 3 and 7 may be provided, and these valves may be connected with reservoir 1 by pipes 73, with the brake cylinder by pipes 74, and with the pipe 71 which connects with the piston ends of the brake cylinder by pipes 75. The valve 3ª comprises a sliding rod 76 which is suitably mounted in the casing of the valve and carries the spring pressed slide 77 which is adapted to connect ports 71, 72 or 70, 72, according to the direction in which the slide is moved. Springs 78, 79 in the opposite ends of valve 3 operate upon the ends of rod 76 and tend to maintain the same in the position shown in the drawings in which all the ports are closed. In the opposite ends of the casing are also contained the coils 80, 81, which respectively control the armatures 82, 83 attached to shaft 76. In one end of the casing is formed a chamber 84 and in chamber 84 is a piston 85 mounted upon shaft 76, and an opening 86 is arranged in the casing in such position that when piston 85 is moved to the position to connect ports 70, 72, by the slide 77 the restricted opening 86 will be uncovered by the piston 85. A pipe 87 connects chamber 84 with pipe 72. From the + source of current a circuit leads through the respective coils 80 and 81 as follows: wire 87, coil 80, wire 88 to segments 89 of the controller 21 and from the blade 26 of the controller a wire 90 leads to ground; from the source by wire 91, coil 81, wire 92 to segment 93 of controller 1. Segment 93 is connected with segment 94 by a resistance 95, this resistance being so attached that when contact is made with segment 94 the current will not be strong enough to enable magnet 81 to hold rod 76 against the pressure from reservoir upon piston 85 as hereinafter described. Without the resistance the magnet will be strong enough to move the rod against pressure on piston 85. When a similar operating controller 48 is to be located at the opposite end of the car the segment 96 will be connected with wire 88 by wire 97 and segments 98 and 99, connected by resistance 100, will be connected with wire 92 by wire 101. Wires 92 and 97 are connected respectively by wires 102 and 103 with the wires 104 and 105 which extend throughout the length of the train where several cars are operated in multiple. In this instance additional reservoirs 106 are located upon the respective cars and connected with reservoirs 1 by pipes 107 which contain reducing valves 108.

To apply the brakes the operator moves the blade 26 into contact with segment 94, which establishes a circuit from the + source through wire 91, coil 81, wire 92, segment 93, resistance 95, segment 94, blade 26 and wire 90 to ground. Upon each of the other cars in the system the circuit will be from the + source through wire 91, coil 81, wire 92, wire 102, wire 105, wire 102 at the car upon which the controller is being operated, and thence to ground as before described. This circuit energizes coil 81 which acting upon armature 83 moves rod 76 and slide 77 to such position that pipes 70 and 72 are connected. Thereupon air is admitted from the reservoir through pipes 70 and 72 to the brake cylinder. At the same time air from the reservoir enters pipe 87 from pipe 72 and enters chamber 84, and acting upon piston 85 moves the valve to connect pipes 71 and 72, and closes pipe 70, thus shutting off pressure from the reservoir and permitting leakage of pressure from the brake cylinder to the atmosphere and also connecting the small opening 86 with chamber 84 and permitting leakage of air from chamber 84. This "fanning" movement of the valve 3ᵃ will continue as long as blade 26 is in contact with segment 94. An emergency application of the brakes is secured by moving blade 26 into contact with segment 93 which cuts out resistance 95 and thereupon coil 81 becomes strong enough to hold the slide 77 in position to connect the reservoir and brake cylinder notwithstanding the pressure upon piston 85. To release the brakes the blade 26 is moved into contact with segment 89 whereupon a circuit is established from the + source through wire 87, coil 80, wire 88, segment 89, blade 26 and wire 90 to ground. Also from the other cars through wires 104 and 103 to segment 89 and to ground at the controller from which the system is being operated. This circuit energizes coil 80 and moves the armature 82, rod 76 and slide 77 into position to connect pipes 71 and 72, thus permitting the discharge of air from the brake cylinder to the atmosphere.

If it should be desired to operate the mechanism upon any one of the cars without respect to the electric controller the valves 3ᵃ or 7 may be operated by hand to connect the reservoir with the brake cylinder or the brake cylinder with the exhaust pipes.

In Figs. 13 to 16 I have illustrated in diagram different arrangements of connections. In Fig. 16 the diagram illustrates the circuits heretofore described with respect to Fig. 12. In Fig. 13 I have provided that the circuit shall be always grounded through coil 80, the segment 89 being connected through resistance 109 with segment 110. The force of spring 78 is so adjusted that it balances the force of coil 80, when the resistance 109 is in circuit, thereby maintaining rod in position to close all the ports of the valve. If now, blade 26 is moved to cut out resistance 109 the coil 80 overcomes spring 78 and moves rod 76 to cause release of the brakes as before described. If blade 26 is moved into contact with segment 94 the coil 81 receives enough current to unbalance the spring 78 and coil 80, and move rod 76 in the opposite direction and cause the successive opening and closing of the valve as heretofore described. Movement of blade 26 to segment 93 cuts out resistance 95 and causes an emergency application as above described. Emergency application may also be caused by moving switch blade 111 into contact with contact 112 and thus grounding coil 81, or by opening switch 113 and permitting spring 78 to move rod 76, either alone or aided by coil 81. In Fig. 14 the wires 88 and 91 are connected by wire 114 with the operating current intermediate the controller 115 and the motor 116. Blade 26 is adapted to make contact with the respective resistance contact 117 and 118. In this instance when current is cut off from the motor by controller 115, the motor acting as a generator furnishes current for the energizing of the proper coil 80 or 81.

In order to insure a constant supply of current for operating the valve, the wire 114, of Fig. 14, may be connected with both the armature circuit of the motor and with the lighting circuit of the car, or with a storage battery 119, as shown in Fig. 15.

It will be seen of course that various arrangements of connections and circuits may be employed, and that any suitable types of brake and valve mechanism may also be used, without departing from the invention, and I therefore desire it to be understood that I do not limit myself to the precise construction shown.

Having thus described my invention, I declare that what I claim as new and desire to secure by Letters Patent, is,—

1. The combination with a reservoir, brake cylinder and a valve controlling communication between the same, of means for normally holding said valve with the ports closed, electric circuits controlling said valve, and means for regulating said circuits to actuate said valve, substantially as described.

2. The combination with a reservoir, brake cylinder and a valve controlling communication between the same, of means for normally holding said valve against movement in either direction with the ports closed, electric circuits controlling said valve, and means for regulating said circuits to actuate said valve, substantially as described.

3. The combination with a reservoir, brake cylinder and a valve controlling communication between the same, of means for normally holding said valve against movement in either direction, with the ports closed, electric circuits controlling said valve, means for regulating said circuits to actuate said valve, and means for energizing either of said circuits, substantially as described.

4. The combination with a reservoir, brake cylinder and a valve controlling communication between the same, of means for normally holding said valve against movement in either direction, with the ports closed, electric circuits controlling said valve, means for regulating said circuits to actuate said valve, means for energizing either of said circuits, and a controller adapted to regulate the intensity thereof, substantially as described.

5. The combination with the reservoir, brake cylinder and valve controlling communication between the same, of electric circuits controlling said valve, means for normally holding said valve in closed position, and means for energizing either of said circuits to move the valve in one direction or the other, substantially as described.

6. The combination of a plurality of cars each having a brake mechanism, a valve controlling the operation of the same, electric circuits controlling said valve, means normally holding the valve against movement, a circuit between said cars, and means for grounding said circuit through one of the circuits on each of the cars, said means being operated from one of the cars, substantially as described.

7. The combination of a plurality of cars each having a brake mechanism, a valve controlling the operation of the same, electric circuits controlling said valve, a circuit between said cars, and means for grounding said circuit through one of the circuits on each of the cars, said means being operated from one of the cars, substantially as described.

8. The combination with the reservoir, brake cylinder and valve controlling communication between the same, of an electric motor adapted to move said valve, means for normally holding said valve in closed position, and means for electrically actuating said motor in one direction or the other, substantially as described.

9. The combination with the reservoir, brake cylinder and valve controlling communication between the same, of an electric motor adapted to move said valve, means for electrically actuating said motor in one direction or the other, means whereby when said motor is moved to open communication between the reservoir and brake cylinder the motor will return to normal position, and means for preventing the operation of said last named means, substantially as described.

10. The combination with the reservoir, brake cylinder and valve controlling communication between the same, of an electric motor adapted to move said valve and having two actuating coils, an electric circuit, means for grounding the same through either of said coils, means for maintaining the valve in normal position, and means for preventing the operation of said last named means, substantially as described.

11. The combination of a plurality of cars, each of which is provided with a brake mechanism, a valve controlling the operation of the same, and an electric motor for operating said valve, said motor having two actuating coils, means normally holding the motor against movement, an electric circuit extending throughout the train, and controllers upon each of said cars adapted to ground said circuit through either one of said coils upon all of the cars, and to vary the intensity of the circuit, substantially as described.

12. The combination with the reservoir, brake cylinder and valve controlling communication between the same, of an electric motor adapted to move said valve, means for electrically actuating said motor, means for automatically returning said motor to normal position immediately after each movement thereof, and means for establishing an electric circuit including said motor, substantially as described.

13. The combination with a compressed air supply, of a brake cylinder, a valve controlling the communication between the air supply and the brake cylinder, means for causing the valve to assume a normally neutral position, and controlling means adapted to cause the automatic alternate operation of the said means, substantially as described.

14. The combination with a reservoir, of a brake cylinder, a valve controlling the communication between the same, means for automatically governing the valve to alternately apply and release the brakes, substantially as described.

15. The combination with a reservoir, of a brake cylinder, and a valve controlling the communication between the same, means for automatically governing the valve to alternately apply and release the brakes, and controlling means therefor, substantially as described.

16. The combination with a reservoir of a brake cylinder and a valve controlling communication between the same, means for automatically reciprocating the valve to apply and release the brakes, and controlling means therefor, substantially as described.

17. The combination with a reservoir, of a brake cylinder and a valve controlling the communication between the same, means for operating the valve to apply and release the brakes alternately, and controlling means therefor, whereby the brakes may be "fanned", held set, or an emergency application may be made, substantially as described.

18. The combination with a reservoir, of a brake cylinder, a valve controlling communication between the same, electric means for controlling said valve to alternately apply and release the brakes automatically, substantially as described.

19. The combination with a reservoir, of a brake cylinder, a valve controlling the communication between the same, electrical means for controlling said valve to alternately apply and release the brakes automatically, and a controller whereby the brakes can be "fanned", held set, or an emergency application be made, substantially as described.

20. In a brake mechanism, the combination with a brake, of electrically controlled automatic means for alternately applying and releasing the brake continuously, and means under the control of the operator for throwing said automatic means in and out of action, substantially as described.

In testimony whereof I affix my signature, in presence of two witnesses.

FRANK B. RAE.

Witnesses:
STANTON CLARKE,
O. J. GILLETT.